United States Patent
Lee et al.

(10) Patent No.: US 10,111,213 B2
(45) Date of Patent: Oct. 23, 2018

(54) METHOD FOR REPORTING MEASUREMENT RESULT FOR DETERMINING POSITION IN WIRELESS COMMUNICATION SYSTEM, AND DEVICE THEREFOR

(71) Applicant: LG ELECTRONICS INC., Seoul (KR)

(72) Inventors: Hyunho Lee, Seoul (KR); Hanjun Park, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/325,964

(22) PCT Filed: Mar. 22, 2016

(86) PCT No.: PCT/KR2016/002859
§ 371 (c)(1),
(2) Date: Jan. 12, 2017

(87) PCT Pub. No.: WO2016/153253
PCT Pub. Date: Sep. 29, 2016

(65) Prior Publication Data
US 2017/0171857 A1     Jun. 15, 2017

Related U.S. Application Data

(60) Provisional application No. 62/138,405, filed on Mar. 26, 2015, provisional application No. 62/159,370, filed on May 11, 2015.

(51) Int. Cl.
*H04W 24/10* (2009.01)
*H04W 72/04* (2009.01)
(Continued)

(52) U.S. Cl.
CPC ....... *H04W 72/0413* (2013.01); *G01S 5/0273* (2013.01); *G01S 7/02* (2013.01);
(Continued)

(58) Field of Classification Search
CPC ......... H04W 72/0413; H04W 72/1284; H04W 24/10; H04W 72/04; H04W 72/12;
(Continued)

(56) References Cited

U.S. PATENT DOCUMENTS

| | | | |
|---|---|---|---|
| 2011/0143770 A1 | 6/2011 | Charbit et al. | |
| 2011/0275385 A1* | 11/2011 | Escolar-Piedras | H04W 64/00 455/456.1 |
| 2012/0108270 A1* | 5/2012 | Kazmi | H04W 64/00 455/456.5 |
| 2013/0237247 A1* | 9/2013 | Lee | G01S 5/06 455/456.1 |
| 2013/0260793 A1* | 10/2013 | Lim | G01S 5/10 455/456.1 |
| 2014/0057664 A1* | 2/2014 | Pei | H04W 64/006 455/456.5 |
| 2014/0112180 A1* | 4/2014 | Axmon | H04W 24/10 370/252 |
| 2014/0176366 A1 | 6/2014 | Fischer et al. | |
| 2014/0233457 A1* | 8/2014 | Koutsimanis | H04J 11/005 370/328 |

(Continued)

OTHER PUBLICATIONS

PCT International Application No. PCT/KR2016/002859, Notification of Transmittal of the International Search Report and the Written Opinion of the International Searching Authority, or Declaration dated Jun. 30, 2016, 9 pages.

*Primary Examiner* — Meless Zewdu
(74) *Attorney, Agent, or Firm* — Lee, Hong, Degerman, Kang & Waimey PC

(57) ABSTRACT

A method for reporting a measurement result for determining a position in a wireless communication system, according to one embodiment of the present invention, is performed by a terminal and may comprise the steps of: receiving positioning reference signal (PRS)-related information comprising a position identifier of each of a plurality of base stations; performing a measurement on the PRSs transmitted by each of the plurality of base stations; if the position identifier of each of the plurality of base stations are identical to each other, selecting at least one measurement result among the measurement results for the PRSs; and reporting the selected measurement result to a serving base station.

14 Claims, 9 Drawing Sheets

(51) Int. Cl.
*H04W 72/12* (2009.01)
*G01S 5/02* (2010.01)
*G01S 7/02* (2006.01)
*G01S 13/16* (2006.01)

(52) U.S. Cl.
CPC ............ *G01S 13/16* (2013.01); *H04W 24/10* (2013.01); *H04W 72/1284* (2013.01)

(58) Field of Classification Search
CPC ......... H04W 56/0065; H04W 56/0085; H04W 56/0095; H04W 88/00; H04W 88/02; H04W 88/08; H04W 4/025; H04W 72/085; G01S 5/0273; G01S 7/02; G01S 13/16; G01S 5/02
See application file for complete search history.

(56) References Cited

U.S. PATENT DOCUMENTS

| | | |
|---|---|---|
| 2015/0018010 A1 | 1/2015 | Fischer |
| 2016/0150376 A1* | 5/2016 | Chiou ................... H04W 4/025 455/456.2 |
| 2016/0234709 A1* | 8/2016 | Fischer ................... H04W 4/02 |
| 2016/0242052 A1* | 8/2016 | Kazmi ................. H04W 24/10 |
| 2016/0265543 A1* | 9/2016 | Fujita ................. F04D 29/4226 |

\* cited by examiner

METHOD FOR REPORTING MEASUREMENT RESULT FOR DETERMINING POSITION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2016/002859, filed on Mar. 22, 2016, which claims the benefit of U.S. Provisional Application No. 62/138,405, filed on Mar. 26, 2015 and 62/159,370, filed on May 11, 2015, the contents of which are all hereby incorporated by reference herein in their entirety.

TECHNICAL FIELD

The present invention relates to a wireless communication system, and more particularly, to a method for reporting a measurement result for position determination in a wireless communication system and device for the same.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE OF THE INVENTION

Technical Task

One object of the present invention is to provide a method of reporting a measurement result for position determination in a wireless communication system and operation for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In one aspect of the present invention, provided herein is a method for reporting a measurement result for position determination in a wireless communication system, the method performed by a user equipment (UE) and including: receiving information on a plurality of reference signal time difference (RSTD) mapping tables; performing a measurement of an RSTD value for positioning reference signals (PRSs) transmitted from one or more evolved node Bs (eNBs); and reporting, to a serving eNB, an RSTD report value, which corresponds to the RSTD value, in a specific RSTD mapping table among the plurality of the RSTD mapping tables.

Additionally or alternatively, each of the plurality of the RSTD mapping tables may contain a plurality of RSTD intervals and a plurality of RSTD report values, which vary depending on an RSTD interval containing the RSTD value, and the plurality of the RSTD mapping tables may have different RSTD interval step sizes.

Additionally or alternatively, each of the plurality of the RSTD mapping tables may contain a plurality of RSTD intervals and a plurality of RSTD report values, which vary depending on an RSTD interval containing the RSTD value, and the number of the RSTD report values contained in the each of the plurality of the RSTD mapping tables may be different from one another.

Additionally or alternatively, the method may further include receiving, from the serving eNB, an identifier indicating the specific RSTD mapping table among the plurality of the RSTD mapping tables.

Additionally or alternatively, the method may further include: selecting the specific RSTD mapping table from among the plurality of the RSTD mapping tables; and reporting, to the serving eNB, an identifier indicating the selected specific RSTD mapping table.

Additionally or alternatively, the method may further include: selecting the specific RSTD mapping table from among the plurality of the RSTD mapping tables; and reporting, to the serving eNB, a step size of the selected specific RSTD mapping table.

Additionally or alternatively, the method may further include reporting, to the serving eNB, a UE's capability related to the plurality of the RSTD mapping tables.

Additionally or alternatively, if accuracy or quality of the RSTD value is equal to or smaller than a specific value or if uncertainty of the RSTD value is equal to or greater than a specific value, aperiodic PRS transmission by the one or more eNBs may be triggered.

Additionally or alternatively, a specific time interval in which the aperiodic PRS transmission can be performed may be indicated through a higher layer signal.

Additionally or alternatively, the method may further include performing blind detection of an aperiodic PRS in the specific time interval.

Additionally or alternatively, a specific subframe in which the aperiodic PRS transmission is performed may be indicated through a higher layer signal.

Additionally or alternatively, the method may further include sending a request for the aperiodic PRS transmission to the one or more eNBs.

In another aspect of the present invention, provided herein is a method for receiving a measurement result for position determination in a wireless communication system, the method performed by a serving evolved node B (eNB), which serves a user equipment (UE), and including: transmitting, to the UE, information on a plurality of reference signal time difference (RSTD) mapping tables; and receiving, from the UE, an RSTD report value, which corresponds to an RSTD value measured for positioning reference signals (PRSs) transmitted from one or more eNBs, in a specific RSTD mapping table among the plurality of the RSTD mapping tables.

Additionally or alternatively, the method may further include transmitting an aperiodic PRS to the UE if accuracy or quality of the RSTD value is equal to or smaller than a specific value or if uncertainty of the RSTD value is equal to or greater than a specific value.

Additionally or alternatively, a neighbor eNB of the serving eNB may be configured not to transmit data in a specific subframe in which the aperiodic PRS is transmitted or the neighbor eNB may be configured to also transmit the aperiodic PRS.

The above-described aspects of the present invention are merely a part of preferred embodiments of the present invention. Those skilled in the art will derive and understand various embodiments reflecting the technical features of the present invention from the following detailed description of the present invention.

Advantageous Effects

According to one embodiment of the present invention, it is possible to reduce error in position estimation and report a measurement result for position determination efficiently in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
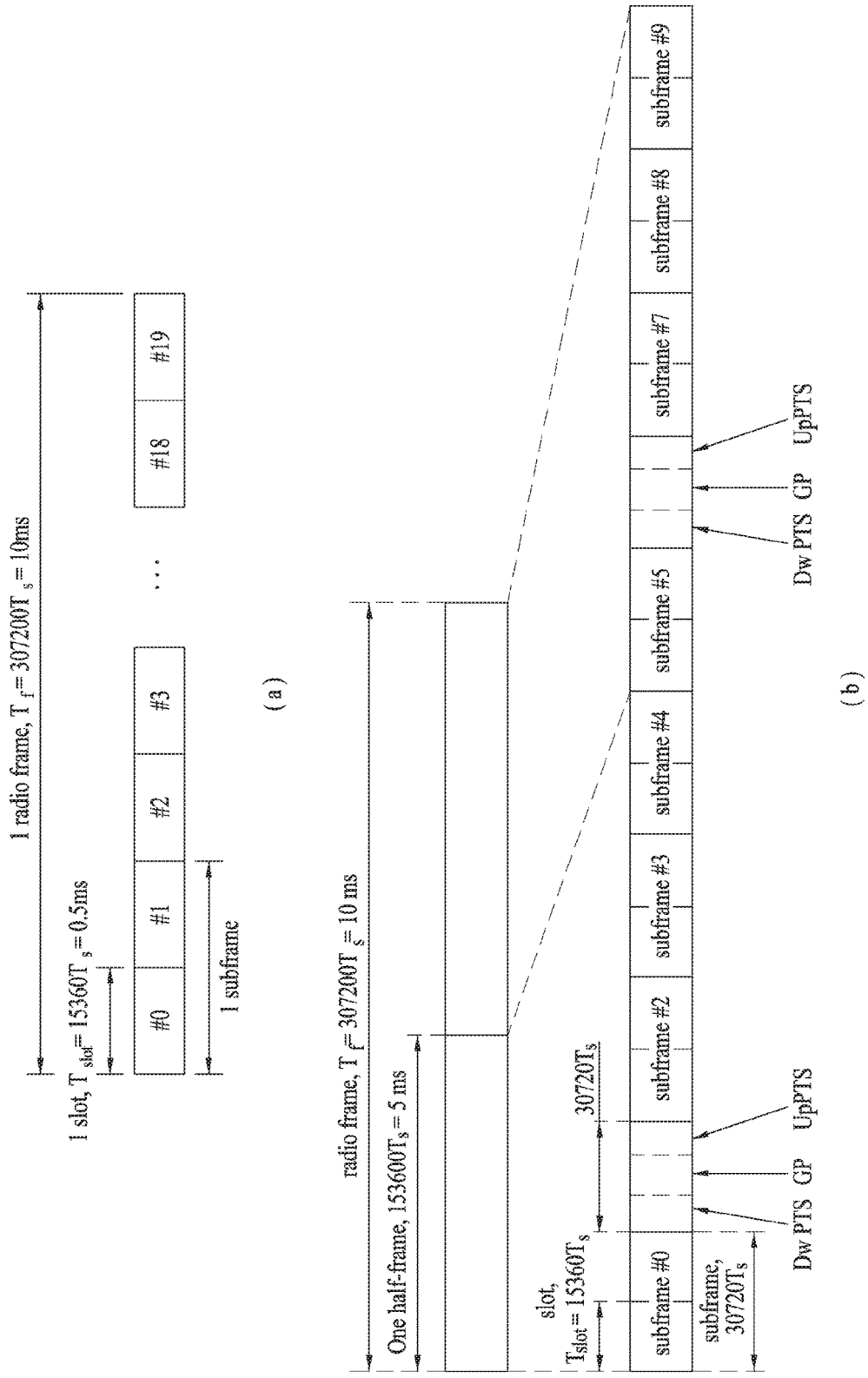
FIG. 1 illustrates a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |

Figure 2:
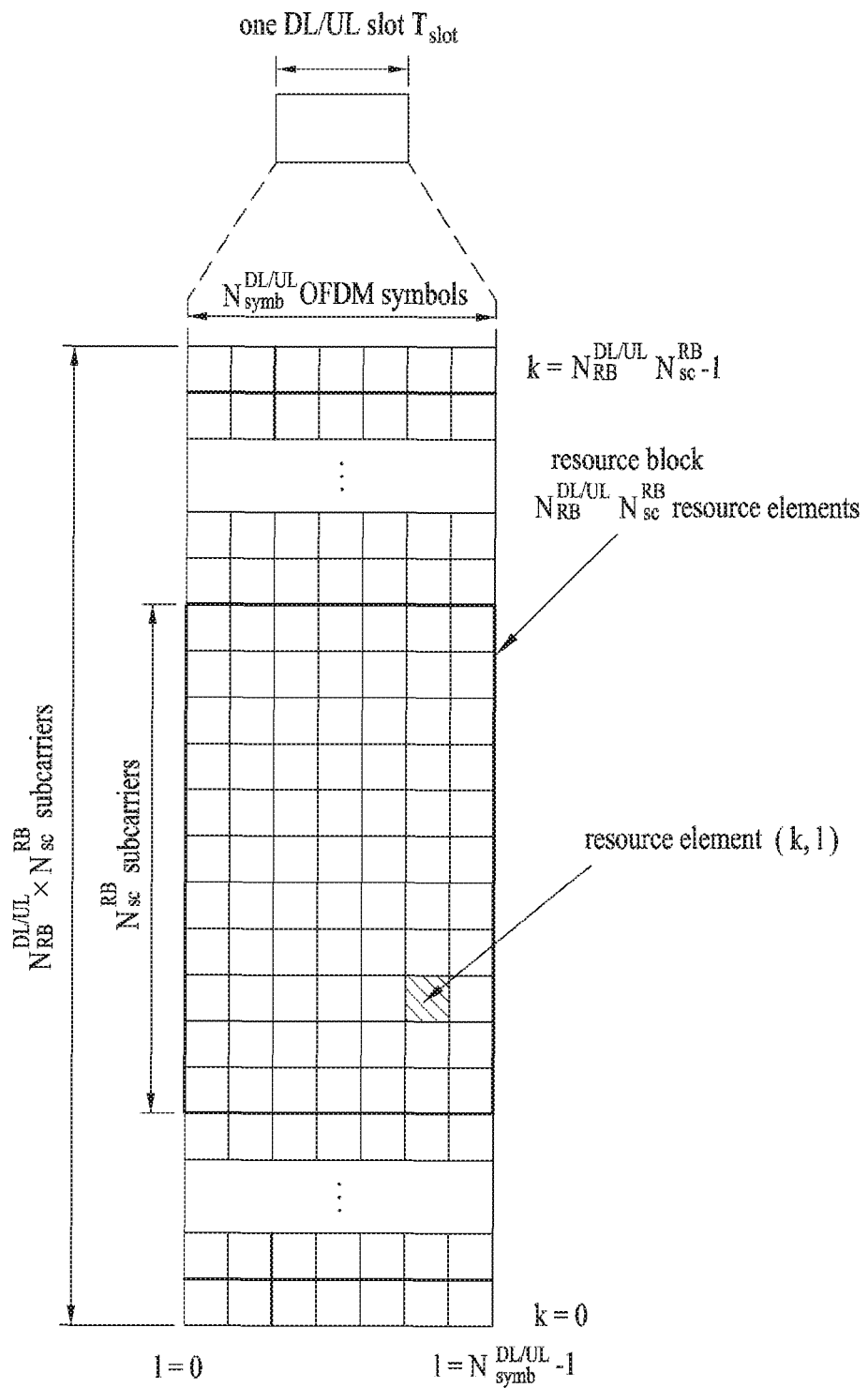
FIG. 2 illustrates structures of downlink/uplink (DL/UL) slots of a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot.

$N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs, which occupy $N_{sc}^{RB}$ same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB−1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
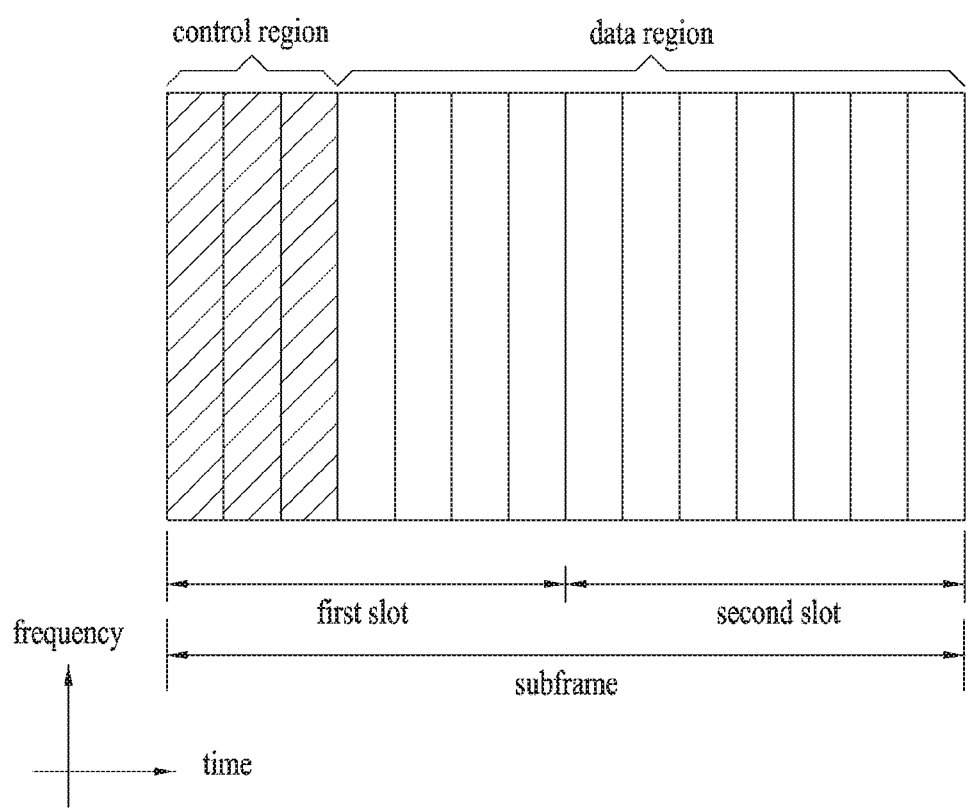
FIG. 3 illustrates a structure of a downlink (DL) subframe used in 3GPP LTE/LTE-A systems.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. The aggregation levels defining the search space are indicated as follows:

TABLE 3

Search Space

| Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
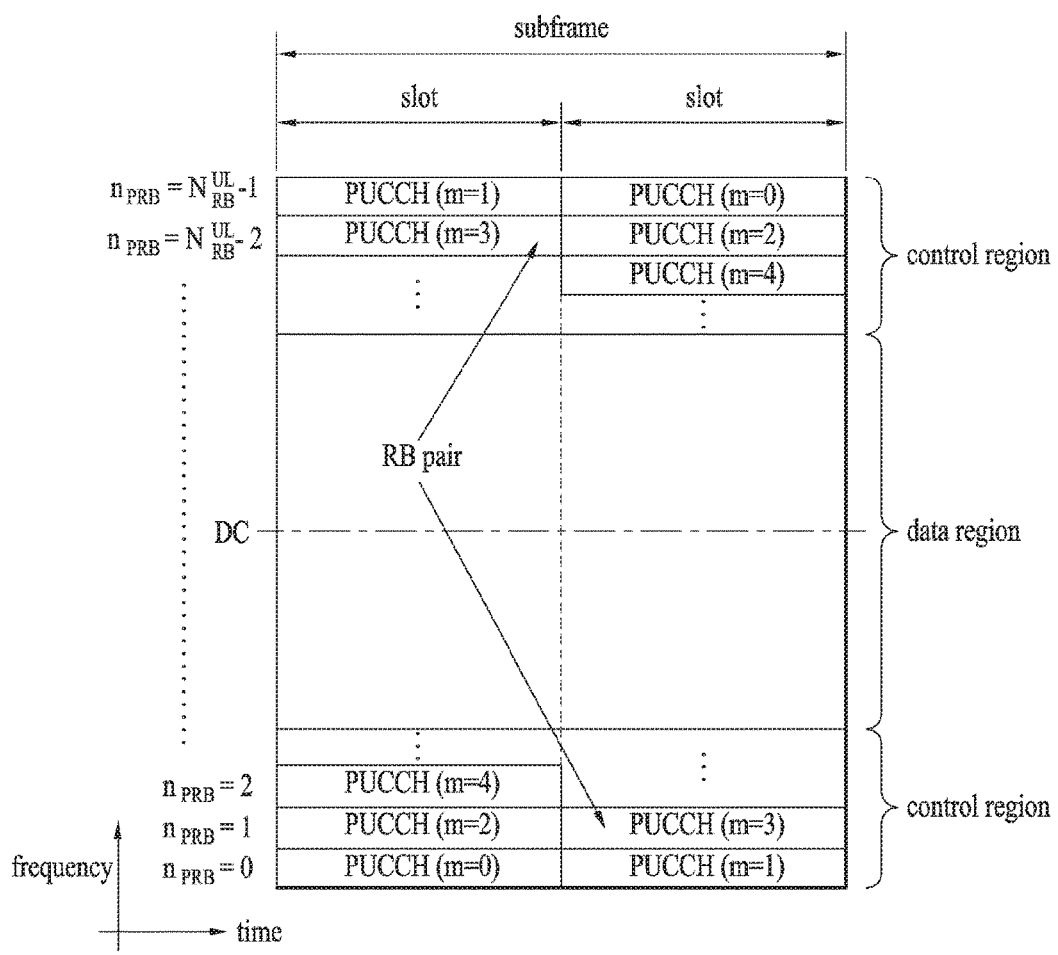
FIG. 4 illustrates a structure of an uplink (UL) subframe used in 3GPP LTE/LTE-A systems.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In general, various methods has been used in a cellular communication system to allow a network to obtain position information of a UE. A positioning scheme based on OTDOA (observed time difference of arrival) is considered as a representative example of the methods. According to the OTDOA-based positioning scheme, in the LTE system, a UE receives information related to PRS (positioning reference signal) transmission of eNBs through higher layer signals and measures PRSs transmitted from cells adjacent to the UE. Thereafter, the UE transmits, to the eNB or network, an RSTD (reference signal time difference) corresponding to a difference between a reception time of a PRS transmitted from a reference eNB and a reception time of a PRS transmitted from a neighbor eNB. The network calculates a position of the UE by using the RSTD and other information. In addition, there are other methods such as an assisted global navigation satellite system (A-GNSS) positioning scheme, an enhanced cell-ID (E-CID) scheme, and an uplink time difference of arrival (UTDOA) scheme. Such positioning methods can be utilized for various location-based services (e.g., advertisement, position tracking, emergency communication means, and the like).

The above-mentioned conventional positioning schemes have been supported in 3GPP UTRA and E-UTRA standards (e.g., LTE Rel-9). In particular, higher accuracy has been required in an in-building positioning scheme. Even though the conventional positioning schemes can be commonly applied to both outdoor and indoor environments, typical positioning accuracy is estimated as, for example, in the case of the E-CID scheme, 150 m in an NLOS (non-LOS) environment and 50 m in a LOS environment. In addition, the OTDOA scheme based on the PRS has a limitation in that positioning error may exceed 100 ms due to eNB synchronization error, multipath propagation error, UE's RSTD measurement quantization error, timing offset estimation error, etc. Moreover, in the case of the A-GNSS scheme, since a GNSS receiver is required, it has a limitation in that implementation complexity and battery consumption is increased. Further, the A-GNSS scheme is difficult to be applied to in-building positioning.

In the present disclosure, proposed is a method for allowing an eNB to calculate position information of a UE. According to the proposed method, a cellular network transmits a specific pilot signal (e.g., a specific reference signal that allows to identify each eNB/TP (transmission point)) to a UE. After measuring each pilot signal, the UE calculates positioning-related estimation values (e.g., OTDOA or RSTD estimation values) according to a specific positioning scheme and then reports the values to the eNB. Thereafter, the eNB can obtain the position information of the corresponding UE.

[LTE Positioning Protocol]

In the LTE system, an LTE positioning protocol (LPP) is defined to support the OTDOA scheme. In addition, according to the LPP, a UE is provided with OTDOA-ProvideAssistanceData with the configuration shown in Table 5 below as an IE (information element).

TABLE 5

-- ASN1STARTOTDOA-ProvideAssistanceData ::= SEQUENCE
{otdoa-ReferenceCellInfo OTDOA-ReferenceCellInfo OPTIONAL,
-- Need ON
otdoa-NeighbourCellInfo OTDOA-NeighbourCellInfoList OPTIONAL,
-- Need ON
otdoa-Error OTDOA-Error OPTIONAL, -- Need ON ...}-- ASN1STOP In Table 5, OTDOA-ReferenceCellInfo means a reference cell for RSTD (reference signal time difference) measurement and it is configured as shown in Table 6 below.

TABLE 6

-- ASN1STARTOTDOA-ReferenceCellInfo ::= SEQUENCE { physCellId INTEGER
(0..503), cellGlobalId ECGI OPTIONAL, -- Need ON earfcnRef
ARFCN-ValueEUTRA OPTIONAL, -- Cond NotSameAsServ0 antennaPortConfig
ENUMERATED {ports1-or-2, ports4, ... } OPTIONAL, -- Cond NotSameAsServ1
cpLength ENUMERATED { normal, extended, ... }, prsInfo PRS-Info OPTIONAL, --
Cond PRS ..., [[ earfcnRef-v9a0 ARFCN-ValueEUTRA-v9a0 OPTIONAL -- Cond
NotSameAsServ2 ]]}-- ASN1STOP Meanwhile, OTDOA-NeighbourCellInfo means cells (e.g., eNBs or TPs) corresponding to targets of the RSTD measurement. For up to three frequency layers, information on up to 24 neighbor cells may be included in each of the frequency layers. That is, information on up to 72 (=3*24) cells can be provided to the UE.

TABLE 7

-- ASN1STARTOTDOA-NeighbourCellInfoList ::= SEQUENCE (SIZE
(1..maxFreqLayers)) OF OTDOA-NeighbourFreqInfoOTDOA-NeighbourFreqInfo ::=
SEQUENCE (SIZE (1..24)) OF
OTDOA-NeighbourCellInfoElementOTDOA-NeighbourCellInfoElement ::=
SEQUENCE { physCellId INTEGER (0..503), cellGlobalId ECGI OPTIONAL, --
Need ON earfcn ARFCN-ValueEUTRA OPTIONAL, -- Cond NotSameAsRef0
cpLength ENUMERATED {normal, extended, ...} OPTIONAL, -- Cond
NotSameAsRef1 prsInfo PRS-Info OPTIONAL, -- Cond NotSameAsRef2
antennaPortConfig ENUMERATED {ports-1-or-2, ports-4, ...} OPTIONAL, -- Cond
NotsameAsRef3 slotNumberOffset INTEGER (0..19) OPTIONAL, -- Cond
NotSameAsRef4 prs-SubframeOffset INTEGER (0..1279) OPTIONAL, -- Cond
InterFreq expectedRSTD INTEGER (0..16383), expectedRSTD-Uncertainty
INTEGER (0..1023), ..., [[ earfcn-v9a0 ARFCN-ValueEUTRA-v9a0 OPTIONAL --
Cond NotSameAsRef5 ]]}maxFreqLayers INTEGER ::= 3-- ASN1STOP In Table 7, PRS-info corresponding to an IE (information element) included in the OTDOA-ReferenceCellInfo and OTDOA-NeighbourCellInfo contains PRS (positioning reference signal) information. Specifically, the PRS-Info includes a PRS bandwidth, a PRS configuration index (IPRS), the number of consecutive downlink subframes, and PRS muting information as shown in Table 8.

TABLE 8

Figure 5:
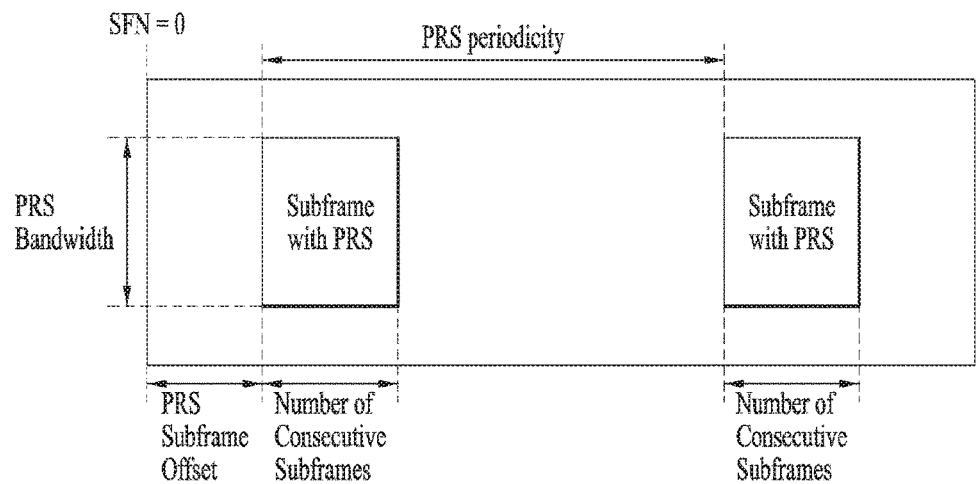
FIG. 5 illustrates a PRS (positioning reference signal) transmission configuration.

-- ASN1STARTPRS-Info ::= SEQUENCE { prs-Bandwidth ENUMERATED { n6,
n15, n25, n50, n75, n100, ... }, prs-ConfigurationIndex INTEGER (0..4095),
numDL-Frames ENUMERATED {sf-1, sf-2, sf-4, sf-6, ...}, ..., prs-MutingInfo-r9
CHOICE { po2-r9 BIT STRING (SIZE(2)), po4-r9 BIT STRING (SIZE(4)), po8-r9
BIT STRING (SIZE(8)), po16-r9 BIT STRING (SIZE(16)), ... } OPTIONAL -- Need
OP}-- ASN1STOP FIG. 5 illustrates a PRS (positioning reference signal) transmission configuration for the above-mentioned parameters.

In this case, PRS periodicity and PRS subframe offset are determined in accordance with a value of the IPRS (PRS configuration index) and Table 9 below shows corresponding relationships.

TABLE 9

| PRS Configuration Index ($I_{PRS}$) | PRS Periodicity (subframes) | PRS Subframe Offset (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-23399 | 1280 | $I_{PRS}$-1120 |

[PRS (Positioning Reference Signal)]

Figure 6:
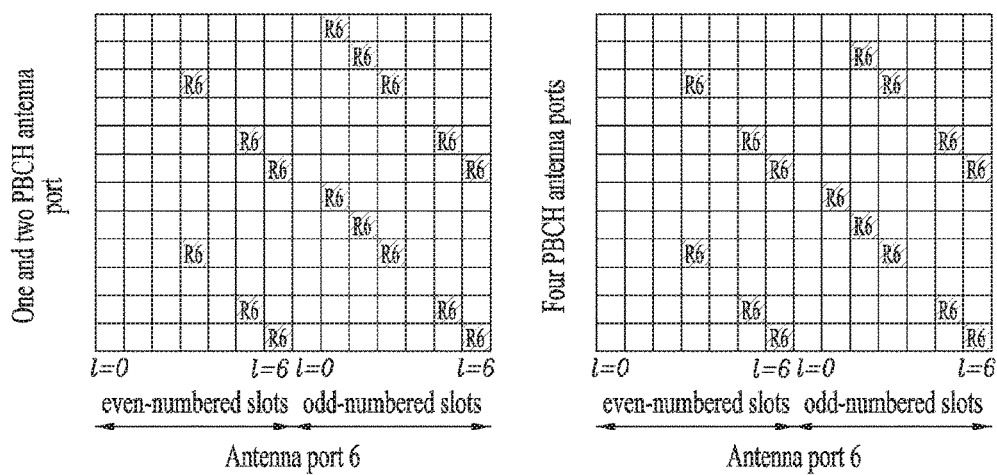
FIGS. 6 and 7 illustrate RE mapping in a PRS.
Figure 7:
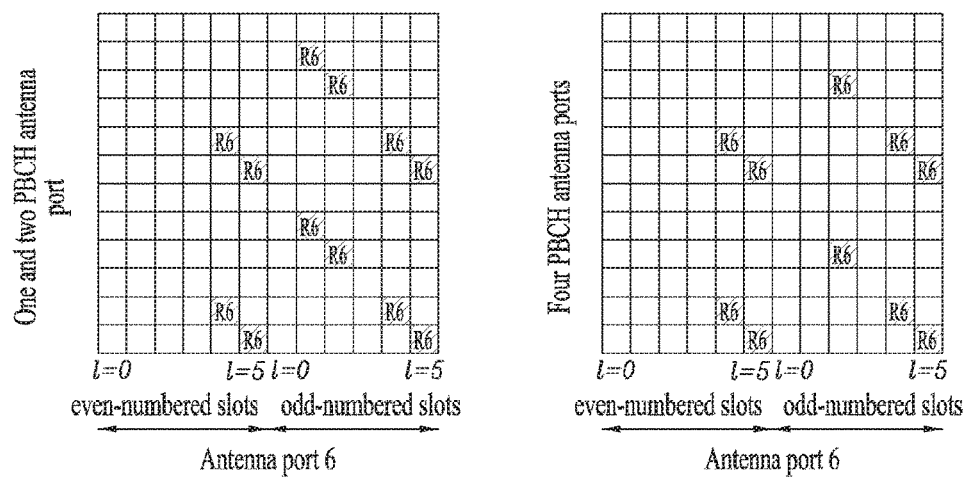

The PRS has a transmission occasion, that is, a positioning occasion at an interval of 160, 320, 640, or 1280 ms and it may be transmitted in N consecutive DL subframes at the positioning occasion where N may be 1, 2, 4, or 6. Although the PRS may be substantially transmitted at the positioning occasion, it may be muted for inter-cell interference control cooperation. Information on PRS muting is signaled to a UE through prs-MutingInfo. Unlike a system bandwidth of a serving eNB, a PRB transmission bandwidth may be independently configured and the PRS is transmitted in a frequency bandwidth of 6, 15, 25, 50, 75, or 100 resource blocks (RBs). A transmission sequence for the PRS is generated by initializing a pseudo-random sequence generator for every OFDM symbol using a function of a slot index, an OFDM symbol index, a cyclic prefix (CP) type, and a cell ID. The generated transmission sequences for the PRS are mapped to resource elements (REs) based on whether a normal CP or an extended CP is used, as shown in FIG. 6 (in the case of the normal CP) or FIG. 7 (in the case of the extended CP). A position of the mapped RE may be shifted on the frequency axis and a shift value is determined by the cell ID. FIGS. 6 and 7 show positions of REs for PRS transmission on the assumption that the frequency shift is 0.

Hereinafter, operations in the LTE system will be described as a particular embodiment of the present invention. However, the operations described in the present invention can also be applied to a random wireless communication system where positioning-related measurement and reporting thereof is performed by receiving a DL pilot signal and a position of a UE is estimated through the measurement and reporting.

[RSTD Mapping Table]

According to the OTDOA positioning scheme, a UE performs an RSTD measurement based on PRSs transmitted from individual eNBs and reports the RSTD measurement to an eNB. Thereafter, the eNB can estimate a position of the UE. The RSTD is a value obtained by switching a measured subframe timing difference value between a predetermined reference cell and a neighbor cell into a mapping value for reporting. Generally, it is expected that as the number of neighbor cells used by the UE to provide the RSTD increases, positioning performance increases. The RSTD is measured by unit of Ts (=1/(15000*2048) s) and reported to E-SMLC (enhanced serving mobile location centre) for position estimation. According to current LTE standard TS 36.133, RSTD measurement values are mapped as shown in Table 10 below for the purpose of reporting. When a time difference is from −2048 Ts to 2048 Ts, the RSTD has a step size of 1 Ts. On the other hand, when the time difference is greater than 2048 Ts or less than −2048 Ts, it is reported by being mapped by unit of 5 Ts.

TABLE 10

| Reported Value | Measured Quantity Value | Unit |
| --- | --- | --- |
| RSTD_0000 | −15391 > RSTD | Ts |
| RSTD_0001 | −15391 ≤ RSTD < −15386 | Ts |
| ... | ... | ... |

TABLE 10-continued

| Reported Value | Measured Quantity Value | Unit |
| --- | --- | --- |
| RSTD_2258 | −4106 ≤ RSTD < −4101 | Ts |
| RSTD_2259 | −4101 ≤ RSTD < −4096 | Ts |
| RSTD_2260 | −4096 ≤ RSTD < −4095 | Ts |
| RSTD_2261 | −4095 ≤ RSTD < −4094 | Ts |
| ... | ... | ... |
| RSTD_6353 | −3 ≤ RSTD < −2 | Ts |
| RSTD_6354 | −2 ≤ RSTD < −1 | Ts |
| RSTD_6355 | −1 ≤ RSTD ≤ 0 | Ts |
| RSTD_6356 | 0 < RSTD ≤ 1 | Ts |
| RSTD_6357 | 1 < RSTD ≤ 2 | Ts |
| RSTD_6358 | 2 < RSTD ≤ 3 | Ts |
| ... | ... | ... |
| RSTD_10450 | 4094 < RSTD ≤ 4095 | Ts |
| RSTD_10451 | 4095 < RSTD ≤ 4096 | Ts |
| RSTD_10452 | 4096 < RSTD ≤ 4101 | Ts |
| RSTD_10453 | 4101 < RSTD ≤ 4106 | Ts |
| ... | ... | ... |
| RSTD_12709 | 15381 < RSTD ≤ 15386 | Ts |
| RSTD_12710 | 15386 < RSTD ≤ 15391 | Ts |
| RSTD_12711 | 15391 < RSTD | Ts |

In the case of the OTDOA positioning, since a range difference is derived from the RSTD value, it is expected that a unit size used in reporting is reduced due to increase in RSTD granularity, positioning performance also increases. Thus, in consideration of a UE capable of performing a measurement by using increased RSTD granularity, a method for improving positioning performance is proposed.

For the UE capable of performing the measurement by increasing the RSTD granularity, an RSTD mapping table may be defined in advance and used. Alternatively, the RSTD mapping table may be provided to the UE through signaling.

In addition, a plurality of RSTD mapping tables with different RSTD granularity may be defined in advance and used. Alternatively, the RSTD mapping tables may be provided to the UE through signaling. Moreover, the UE may receive information indicating which one of the plurality of the RSTD mapping tables with the different RSTD granularity is used through explicit signaling. For example, signaling indicating which of the RSTD mapping table is used may be included for the UE in a configuration for the RSTD measurement.

If a UE has a capability of performing a measurement by increasing RSTD granularity, the UE reports information on its own capability through signaling.

When a UE is configured with a plurality of RSTD mapping tables with different RSTD granularity, the UE may report an identifier indicating the table used by the corresponding UE by including the identifier in the measurement report. When the identifier is not included in the measurement report, a network or location server determines that the corresponding UE is a legacy UE and then expects that the RSTD will be reported based on the conventional mapping table. Further, when reporting the RSTD measurement, the UE also reports which Ts unit is used for the granularity of the RSTD mapping table, which will be reported, through signaling.

If a UE has the capability of performing the measurement by increasing the RSTD granularity, the corresponding UE may report an identifier indicating which one of a plurality of RSTD mapping tables with different RSTD granularity is used by including the identifier in the measurement report. Alternatively, if a UE has a capability of transmitting a PRS over a broad frequency band (e.g., PRS transmission through a plurality of cells/component carriers based on CA (carrier aggregation)) and processing the PRS transmission over the broad frequency band, the corresponding UE may also include the identifier indicating which one of the plurality of the RSTD mapping tables with the different RSTD granularity is used in the measurement report. Here, the plurality of the mapping tables may include (1) tables having the same number of 'reported values' and different RSTD step sizes (2) tables having different number of 'reported values' and different RSTD step sizes, and (3) tables having the same number of 'reported values' and the same RSTD step size.

When the identifier is not contained in the measurement report, the network or location server determines that the corresponding UE is the legacy UE and then expects that that the RSTD will be reported based on the conventional mapping table.

Since examples of the proposed method described above can be included as one of implementing methods of the present invention, it is apparent that the examples are considered as embodiments of the present invention. Moreover, it is possible to implement each of the aforementioned proposed methods not only independently but also by combining (or merging) at least one of the proposed methods. Furthermore, information on whether the proposed methods are applied (or information on configurations of the proposed methods) can be informed a UE by an eNB through a predefined signal (e.g., physical layer signal or higher layer signal).

[Aperiodic PRS Transmission]

According to the current LTE standard, the PRS transmitted for UE's positioning-related RSTD measurement is periodically transmitted at a predetermined period and on the basis of subframe offset. To improve positioning performance, aperiodic PRS transmission and measurement/reporting associated with the aperiodic PRS transmission may be required. To this end, configuration information related to the aperiodic PRS transmission (e.g., a CP (cyclic prefix) length, an antenna port, a PRS transmission bandwidth, the number of consecutive DL subframes included in a positioning occasion, a location of a transmission resource, etc.) needs to be provided to a UE.

Meanwhile, when the aperiodic PRS transmission is taken into consideration, data transmission of neighbor eNBs/TPs needs to be restricted in order to secure accuracy in the UE's positioning-related RSTD measurement. In other words, it is preferred that only when accuracy/quality in the UE's measurement is equal to or less than a certain level, the aperiodic PRS transmission is additionally configured to minimize a data transfer rate loss in the network. Alternatively, it is preferred that when eNB's uncertainty with respect to the RSTD is equal to or greater than a certain level, the aperiodic PRS transmission is additionally configured.

Therefore, in addition to the conventional PRS transmission, the aperiodic PRS transmission can be configured according to the following rules.

A location server may configure the aperiodic PRS transmission under a specific condition. For instance, if UE's measurement quality is equal to or less than the certain level, the aperiodic PRS transmission may be configured. Alternatively, if eNB's uncertainty with respect to the RSTD is equal to or greater than the certain level, the aperiodic PRS transmission may be configured (according to a request from a UE or without any request from a UE).

A UE may send a request for the aperiodic PRS transmission to a specific neighbor eNB/TP or an eNB/TP corresponding to a reference cell.

Among PRS-related configurations for the aperiodic PRS transmission, configurations except a transmission timing can be provided to a UE through semi-static signaling. Simply, some or all of parameters with respect to a CP length, an antenna port, a PRS transmission bandwidth, the number of consecutive DL subframes included in a positioning occasion, a location of a transmission resource, etc. may be configured equal to those in the conventional PRS transmission. The parameters, which are not equal to those in the conventional PRS transmission, may be provided to the UE through separate signaling.

A timing for the aperiodic PRS transmission can be determined according to a predefined rule. For instance, when it is reported that UE's measurement quality is equal to or less than the certain level, a UE expects that an aperiodic PRS is transmitted in a specific subframe according to the predefined rule and then performs the RSTD measurement in the corresponding subframe. In addition, when it is reported that the UE's measurement quality is equal to or less than the certain level, an eNB/TP transmits the aperiodic PRS in the specific subframe according to the predefined rule. As another example of the aperiodic PRS transmission timing, a specific time interval may be indicated through a higher layer signal or the like and the aperiodic PRS may be transmitted in some subframes included in the specific time interval. A UE may perform the positioning-related measurement through blind detection of the aperiodic PRS within the indicated time interval. In this case, whether the aperiodic PRS is transmitted in the specific subframe may be provided to the UE through explicit signaling.

Regarding a time (e.g., subframe) for the aperiodic PRS transmission, it may be preferred that a neighbor eNB/TP is configured not to transmit data in the corresponding subframe or perform the aperiodic PRS transmission in the corresponding subframe. Thus, when it is reported that the UE's measurement quality is equal to or less than the certain level, a (reference) eNB/TP, which receives the report, may send a request for coordination for the aperiodic PRS transmission to the neighbor eNB/TP. In this case, the coordination request may include not only information on presence of the aperiodic PRS transmission but also information on a muting pattern and the like.

If RSTD measurement corresponding to the aperiodic PRS transmission for an eNB/TP is identical to the RSTD measurement corresponding to the conventional PRS transmission, the former RSTD measurement may be reported using separate resources. Alternatively, the two RSTD measurements may be selectively reported. The network may select a specific one of the two RSTD measurements and then set a UE to report the specific RSTD measurement. Thereafter, the UE may report the specific RSTD measurement. When each RSTD measurement is reported, its quality may also be reported.

Figure 8:
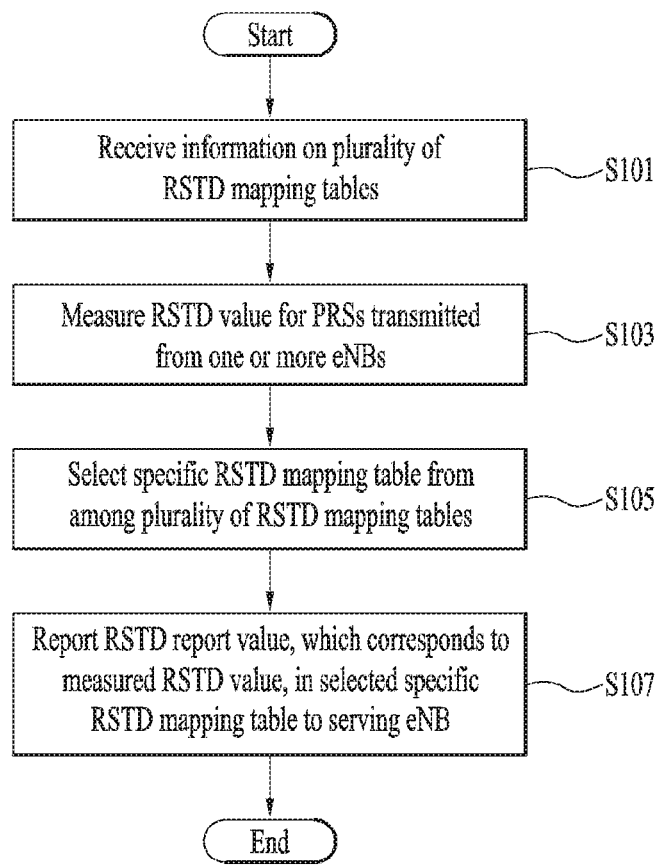
FIG. 8 is a flowchart illustrating a measurement reporting operation performed by a user equipment according to one embodiment of the present invention.

FIG. 8 is a flowchart illustrating a measurement reporting operation performed by a user equipment according to one embodiment of the present invention.

Referring to FIG. 8, a UE may receive information on a plurality of RSTD mapping tables [S101]. For example, as shown in Table 10, each of the plurality of the RSTD mapping tables may include a plurality of RSTD intervals ('Measured Quantity Value' in Table 10) and a plurality of RSTD report values (e.g., 'Reported Value' in Table 10), which vary depending on an RSTD interval including an RSTD value. In this case, the plurality of the RSTD mapping tables may have different step sizes. Alternatively, the number of the RSTD report values contained in each of the plurality of the RSTD mapping tables may be different from one another. Alternatively, the plurality of the RSTD mapping tables may have different step sizes and the number of the plurality of the RSTD report values contained in each of the plurality of the RSTD mapping tables may be different from one another.

After measuring an RSTD value for PRSs transmitted by one or more eNBs [S103], the UE may select a specific RSTD mapping table from the plurality of the RSTD mapping tables [S105]. For instance, if the UE has a capability of performing measurement by increasing RSTD granularity, the UE may select an RSTD mapping table with high granularity from among the plurality of the RSTD mapping tables. That is, the UE may select an RSTD mapping table with a small step size from among the plurality of the RSTD mapping tables. Alternatively, if the UE receives an identifier indicating a specific RSTD mapping table among the plurality of the RSTD mapping tables from a serving eNB, the UE may select the specific RSTD mapping table indicated by the identifier.

After selecting the specific RSTD mapping table, the UE may select an RSTD report value corresponding to the measured RSTD value from within the selected specific RSTD mapping table and then report the RSTD report value to the serving eNB [S107]. For instance, if the selected specific RSTD mapping table corresponds to Table 10 and the measured RSTD value is '−3', the UE may report 'RSTD 6353' corresponding to '−3' to the serving eNB.

In the step S107, the UE may also report an identifier indicating the selected specific RSTD mapping table or a step size of the selected specific RSTD mapping table to the serving eNB.

Figure 9:
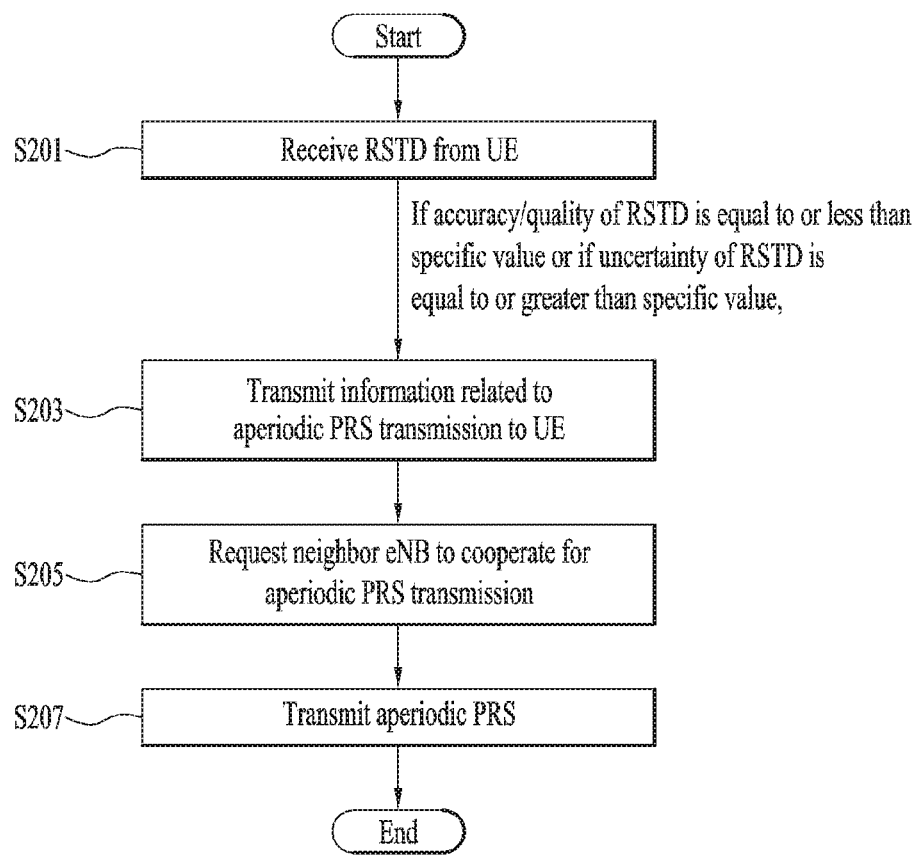
FIG. 9 is a flowchart illustrating an aperiodic PRS transmission operation performed by an eNB according to one embodiment of the present invention.
Figure 10:
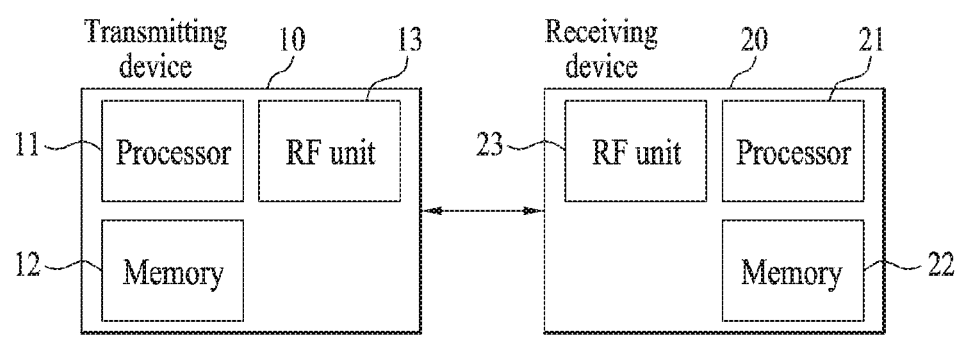
FIG. 10 is a block diagram of devices for implementing the embodiment(s) of the present invention.

FIG. 9 is a flowchart illustrating an aperiodic PRS transmission operation performed by an eNB according to one embodiment of the present invention.

Referring to FIG. 9, an eNB may receive an RSTD measured by a UE from the UE [S201]. In the step S201, if accuracy/quality of the received RSTD is equal to or less than a specific value or if uncertainty of the received RSTD is equal to or greater than a specific value, aperiodic PRS transmission of the eNB may be triggered. Alternatively, different from the example illustrated in FIG. 9, even when the eNB does not receive any RSTD from the UE, the eNB's aperiodic PRS transmission may be triggered by a request for the aperiodic PRS transmission from the UE.

When the aperiodic PRS transmission is triggered, the eNB may transmit information related to the aperiodic PRS transmission to the UE [S203]. For instance, the information related to the aperiodic PRS transmission may include a specific time interval in which the aperiodic PRS transmission can be performed or a specific subframe in which the aperiodic PRS transmission is performed. However, the present invention is not limited thereto. That is, the information related to the aperiodic PRS transmission may be determined according to a predefined rule before the aperiodic PRS transmission is triggered.

In some embodiments, information on a timing for the aperiodic PRS transmission may be provided to the UE after the aperiodic PRS transmission is triggered and other information (e.g., a CP length, an antenna port, a PRS transmission bandwidth, the number of consecutive DL subframes included in a positioning occasion, a location of a transmission resource, etc.) except the information on the aperiodic PRS transmission timing may be provided to the UE through semi-static signaling.

In some embodiments, the eNB may request a neighbor eNB to cooperate for the aperiodic PRS transmission [S205]. For instance, the eNB may request the neighbor eNB not to transmit data in the specific subframe where the aperiodic PRS transmission is performed. Alternatively, the eNB may request the neighbor eNB to perform the aperiodic PRS transmission in the specific subframe as well.

The eNB may aperiodically transmit the PRS to the UE [S207]. If the UE knows the specific subframe where the aperiodic PRS transmission is performed, the UE may receive the aperiodic PRS in the specific subframe. Alternatively, if the UE does not know the specific subframe where the aperiodic PRS transmission is performed but knows the specific time interval where the aperiodic PRS transmission can be performed, the UE may perform blind detection of the aperiodic PRS on the specific time interval.

FIG. 8 is a block diagram illustrating elements of a transmitting device 10 and a receiving device 20 for implementing the embodiment(s) of the present invention. The transmitting device 10 and the receiving device 20 include radio frequency (RF) units 13 and 23 for transmitting or receiving a wire and/or radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output information. The memories 12 and 22 may be used as a buffer. The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs predetermined coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiving device in the form of one or more layers. For frequency up-conversion, the RF unit 13 may include an oscillator. The RF unit 13 may include Nt (Nt is a positive integer greater than 1) transmitting antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr receiving antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink.

The transmitting device 10 and/or the receiving device 20 may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention can be applied to wireless communication devices such as a user equipment, a relay, and a base station.

What is claimed is:

1. A method for reporting a measurement result for position determination in a wireless communication system, the method performed by a terminal and comprising:
   measuring, by the terminal, an RSTD value for at least one positioning reference signal (PRS) transmitted from one or more base stations; and
   reporting, by the terminal and to a network, a reference signal time difference (RSTD) report value which corresponds to the measured RSTD value and a range to which the measured RSTD value belongs, using a plurality of predefined RSTD mapping tables,
   wherein the reported range is smaller than 1 Ts, wherein Ts is 1/30720 ms.

2. The method of claim 1, further comprising reporting, to the network, a capability of the UE related to the plurality of the RSTD mapping tables.

3. The method of claim 1, wherein if accuracy or quality of the RSTD value is equal to or smaller than a specific value or if uncertainty of the RSTD value is equal to or greater than a specific value, aperiodic PRS transmission by the one or more base stations is triggered.

4. The method of claim 3, wherein a specific time interval in which the aperiodic PRS is transmitted is indicated through a higher layer signal.

5. The method of claim 4, further comprising performing blind detection of an aperiodic PRS in the specific time interval.

6. The method of claim 3, wherein a specific subframe in which the aperiodic PRS is transmitted is indicated through a higher layer signal.

7. The method of claim 1, further comprising transmitting a request for an aperiodic PRS transmission to the one or more base stations.

8. A terminal reporting a measurement result for position determination in a wireless communication system, comprising:
   a receiver;
   a transmitter; and
   a processor that controls the receiver and the transmitter;
   wherein the processor measures an RSTD value for at least one positioning reference signal (PRS) transmitted from one or more base stations, and reports, to a network, a reference signal time difference (RSTD) report value which corresponds to the measured RSTD value and a range to which the measured RSTD value belongs, using a plurality of predefined RSTD mapping tables, and
   wherein the reported range is smaller than 1 Ts, wherein Ts is 1/30720 ms.

9. The terminal of claim 8, further comprising reporting, to the network, a capability of the UE related to the plurality of the RSTD mapping tables.

10. The terminal of claim 8, wherein if accuracy or quality of the RSTD value is equal to or smaller than a specific value or if uncertainty of the RSTD value is equal to or greater than a specific value, aperiodic PRS transmission by the one or more base stations is triggered.

11. The terminal of claim 10, wherein a specific time interval in which the aperiodic PRS is transmitted is indicated through a higher layer signal.

12. The terminal of claim 11, further comprising performing blind detection of an aperiodic PRS in the specific time interval.

13. The terminal of claim 10, wherein a specific subframe in which the aperiodic PRS is transmitted is indicated through a higher layer signal.

14. The terminal of claim 8, wherein the processor transmits a request for an aperiodic PRS transmission to the one or more base stations.

* * * * *